April 14, 1953     G. B. NELSON ET AL     2,634,540
FISH CATCHING MEANS
Filed Sept. 10, 1949
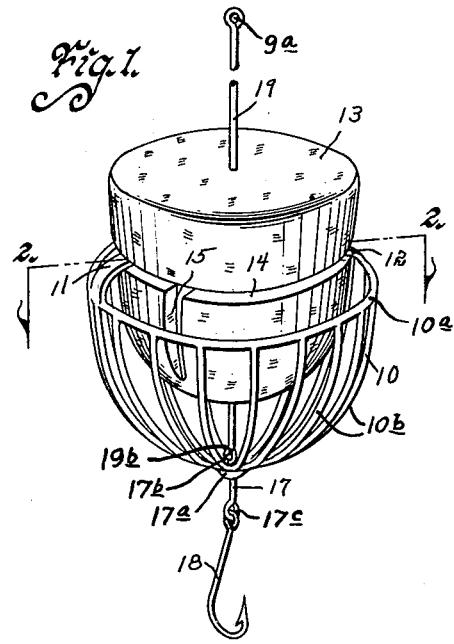
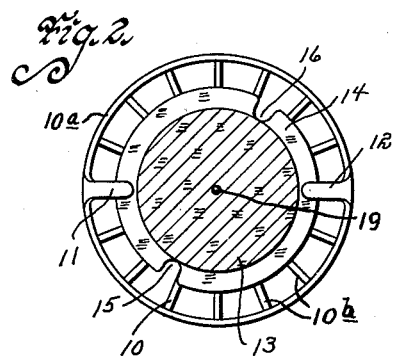
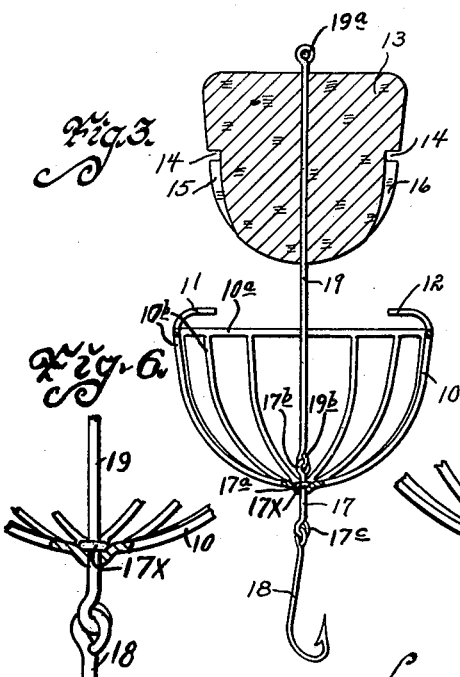
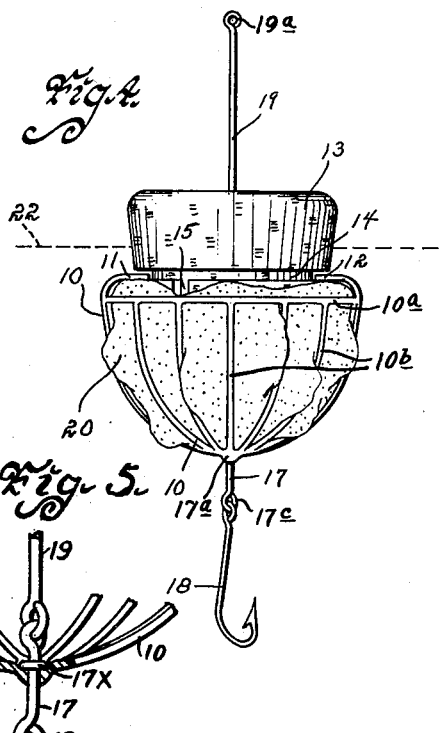
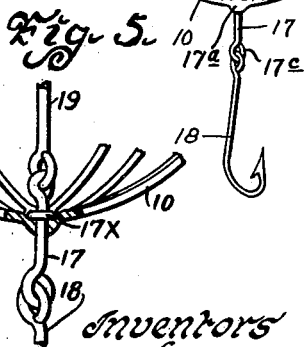
Inventors
George B. Nelson & Edwin D. Neiman
by M. Talbert Dick
Attorney
Witness
Edward C. Selley Patented Apr. 14, 1953

2,634,540

UNITED STATES PATENT OFFICE 2,634,540

FISH CATCHING MEANS

George B. Nelson and Edwin D. Neiman,
Des Moines, Iowa

Application September 10, 1949, Serial No. 115,004

3 Claims. (Cl. 43—43.1)

This invention relates to fish lures and more specifically to lures used as an extension element for lines employed in still fishing.

Lures are usually classified as those used to excite the fish into striking, and those that are or indicate food. From a food standpoint fish feed naturally on minnows, worms, frogs, insects and like. The usual procedure is to bait the fish hook with such and trust to luck that a fish will accidentally swim into the vicinity of the baited hook and notice the single morsel. Obviously, there is little to attract the fish from a distance, and therefore the principal object of our invention is to provide a fish catching means that will draw fish from considerable distances into the baited fish hook area.

More specifically the object of our invention is to first attract a plurality of minnows, which in turn will attract the desired large fish. To this end we provide a cage for retaining food for the minnows, and a baited hook thereon for the large fish.

A still further object of our invention is to provide a lure that may be easily and quickly baited.

A still further object of our invention is to provide a lure for still fishing that is economical in manufacture and durable in use.

These and other objects will be apparent to those skilled in the art.

Our invention consists in the construction, arrangement, and combination of the various parts of the device whereby the objects contemplated are attained as hereinafter more fully set forth, pointed out in our claims, and illustrated in the accompanying drawings, in which:

Fig. 1 is a perspective view of our lure.

Fig. 2 is a cross-sectional view of the device taken on line 2—2 of Fig. 1.

Fig. 3 is a side view partly in section of the lure in open condition for the insertion of minnow food.

Fig. 4 is a side view of the lure with minnow food therein and with the parts in closed, locked condition.

Fig. 5 is an enlarged sectional view of the lower portion of the cage member.

Fig. 6 is a side view, partly in section, showing the shaft as being of one single piece.

We have used the numeral 10 to generally designate the cage portion of the device. This cage is of cup shaped open wire construction, as shown in Fig. 1 and has the circumferential upper rim 10a and the solid dead center bottom portion 17a. Bottom portion 17a has a central passage therethrough which is surrounded by a seat-providing recess for a washer 17x. Laterally spaced curved wires 10b connect bottom portion 17a and upper rim 10a. The numerals 11 and 12 designate two diametrically opposed inwardly extending fingers on the upper rim 10a of the cage 10. The numeral 13 designates the bobber or cork having its lower end portion in the form of a semi-sphere, as shown in Fig. 3. The diameter of this bobber float is substantially less than the diameter of the top of the cage 10, but is of a general diameter greater than the distance between the ends of the two fingers 11 and 12. The numeral 14 designates a horizontal peripheral groove around the bobber. The numerals 15 and 16 designate two vertical evenly spaced apart side groove passageways in the side of the bobber. These two groove passageways are below the groove 14 and communicate with the same, as shown in Fig. 3.

The diameter of the bobber between the bottoms of these two groove passageways is slightly less than that of the distance between the two fingers. The same is also true of the diameter of the bobber at the peripheral groove 14. By this arrangement, the bobber may be placed into and detachably locked in the upper portion of the cage, merely by passing the bobber downwardly therein with the fingers in the vertical grooves 15 and 16 until the fingers are in the horizontal peripheral groove, at which time the bobber is rotated to the right or left relative to the cage. The bobber is as easily removed from the cage. The numeral 17 designates a vertical shaft having top and bottom eyes 17b, 17c, respectively, and said shaft 17 is slidably mounted through the dead bottom center 17a of the cage. Pivotally secured on the eye 17c at the lower end of the shaft 17 is a fish hook 18. The numeral 19 designates a shaft having top and bottom eyes 19a, 19b, respectively, and its bottom eye 19b is connected to the eye 17b at the upper end of the shaft 17, said shaft 19 extending slidably and vertically through the center of the bobber 13.

To operate our device it is opened, as shown in Fig. 3, by elevating the bobber. Any suitable minnow food such as bread or like 20 is deposited in the cage and the bobber lowered and locked in the cage, as shown in Fig. 4. The hook 18 is then baited such as by the use of a chub or minnow. In the Figs. 1-4 form of the invention the hook 18 is positioned relatively close to the bottom 17a of the cage 10 since it will be noted that the hook-carrying shaft 17 is short and shaft eye 17c forms a stop engaging the inner surface of the cage bottom 17a to limit downward movement of hook 18. When cage fingers 11, 12 are anchored to the bobber 13 the latter will have its upper portion above water and will support the submerged cage 10.

Fig. 6 shows that the shafts 17, 19 of Figs. 1-4 can be replaced by a single shaft 21 with upper and lower eyes 21a, 21b, respectively. The lower eye 21b carries the hook 18 while the upper eye 21a is adapted for attachment to a fishing line (not shown). In the Fig. 6 form of the invention the shaft eye 21a engages the top of bobber 13 when the cage and bobber are assembled to limit downward movement of the shaft 21 with hook 18. The upper end of the shaft 19 is secured to a line and the device placed in the water to be fished. Due to the lightness of the bobber its upper end will be above the water surface 22, but the cage 10 will be slightly below the water surface. The bread or like 20 will attract minnows and they will rapidly form into a sizable school around the cage to feed. As shown in Fig. 4, the openings in the cage 10 are of a size to admit of large sections of the bread or other food projecting therethrough while, at the same time, retaining the food in a concentrated mass against release, it being obvious also that the openings in the cage 10 are of a size to admit of the minnows feeding therethrough, as when the mass of bread or other food has been reduced by the feeding minnows. Thus, the school of minnows will be kept in the immediate vicinity of the cage and minnow-baited hook 18. Such a school will in turn attract the desirable large fish to feed on the school of minnows. The large fish will charge the school, and the result will be that the free feeding minnows will scatter, leaving the chub or minnow on the hook 18 for the large fish to grab.

Some changes may be made in the construction and arrangement of our fish catching means without departing from the real spirit and purpose of our invention, and it is our intention to cover by our claims, any modified forms of structure or use of mechanical equivalents which may be reasonably included within their scope.

We claim:

1. In a device of the class described, an open cup shaped cage, two diametrically positioned inwardly extending fingers on the upper edge of said cage, a vertical shaft means extending through said cage, a hook on the lower end of said shaft means, and a float means on said shaft means having grooves capable of detachably receiving said fingers at times.

2. A fishing device comprising a straight rod member having eyes at the ends thereof, a cage member open at its upper end and having a side wall provided with longitudinally extended openings and a bottom, said rod member being secured to the bottom and permitting movement of the cage member relative to the rod, a float rectilinearly slidably mounted on the rod member and having a substantially semispherical bottom portion, a portion thereof being adapted to be received within the cage member with portions of the upper end of the cage member engaging the float, one of the eyes of the rod member constituting a limiting means to outward movement of the float relative to the cage member, and one of said members having latch means to hold the float in fixed relation with the cage member, with a part of the semispherical portion disposed within the cage member.

3. A fishing device comprising a rod means having eyes at the ends thereof, a cage member open at its upper end and having side walls provided with openings therein and including a bottom wall, said rod means extending through the cage bottom wall and permitting movement of the cage member relative to the rod means, the eye at the lower end of the rod means limiting downward movement of the cage, a float rectilinearly slidably mounted on the rod means and having a substantially semispherical bottom portion, a portion thereof being adapted to be received within the cage member with portions of the upper end of the cage means engaging the float, one of the eyes of the rod member constituting a limiting means to outward movement of the float relative to the cage member, and one of said rod means and cage member having means to hold the float in fixed relation, with a part of the semispherical portion disposed within the cage member.

GEORGE B. NELSON.
EDWIN D. NEIMAN.

References Cited in the file of this patent

UNITED STATES PATENTS

| Number | Name | Date |
| --- | --- | --- |
| 13,649 | Johnsson | Oct. 9, 1855 |
| 556,494 | Dales | Mar. 17, 1896 |
| 636,694 | Pflueger | Nov. 7, 1899 |
| 843,946 | Howald | Feb. 12, 1907 |
| 1,193,912 | Marie et al. | Aug. 8, 1916 |
| 1,222,774 | Leonard | Apr. 17, 1917 |
| 1,278,146 | Henthorn | Sept. 10, 1918 |
| 1,816,725 | Freeman | July 28, 1931 |
| 1,980,452 | Tice et al. | Nov. 13, 1934 |
| 2,112,385 | Smith | Mar. 29, 1938 |